May 15, 1962 B. B. FOWLER ET AL 3,034,568
FLAME THROWER
Filed Jan. 12, 1959 9 Sheets-Sheet 6
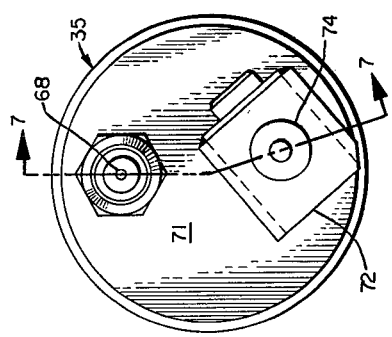
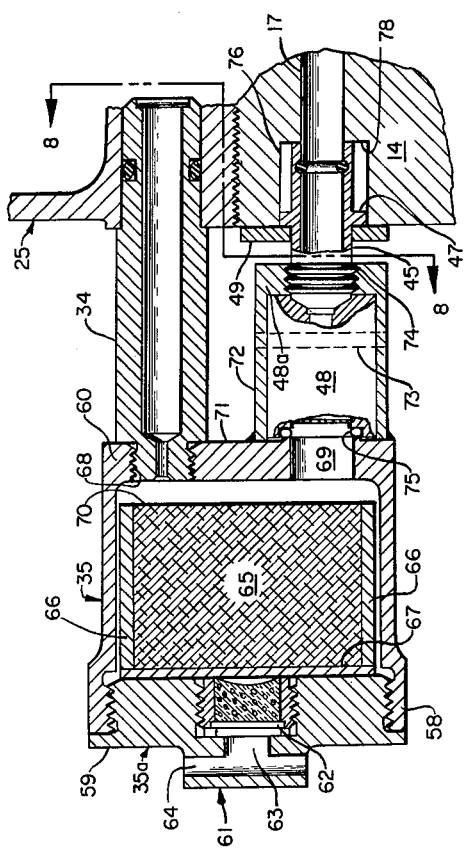
INVENTOR.
BLAIR B. FOWLER
DAVID A. YOUNG
NEAL J. GRISWOLD
BY
ATTORNEY May 15, 1962    B. B. FOWLER ET AL    3,034,568
FLAME THROWER
Filed Jan. 12, 1959    9 Sheets-Sheet 7
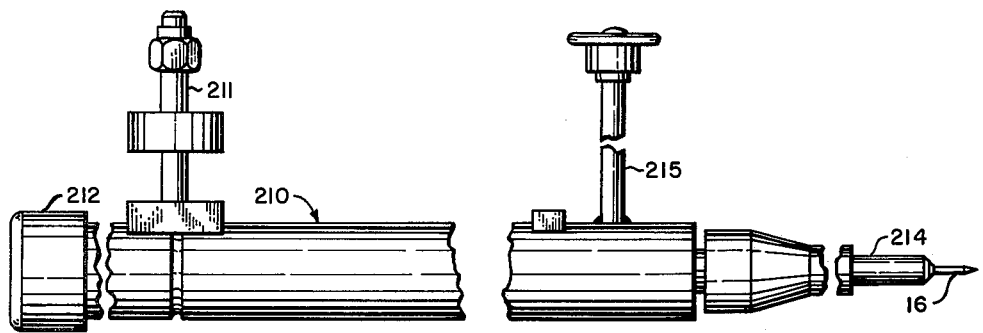
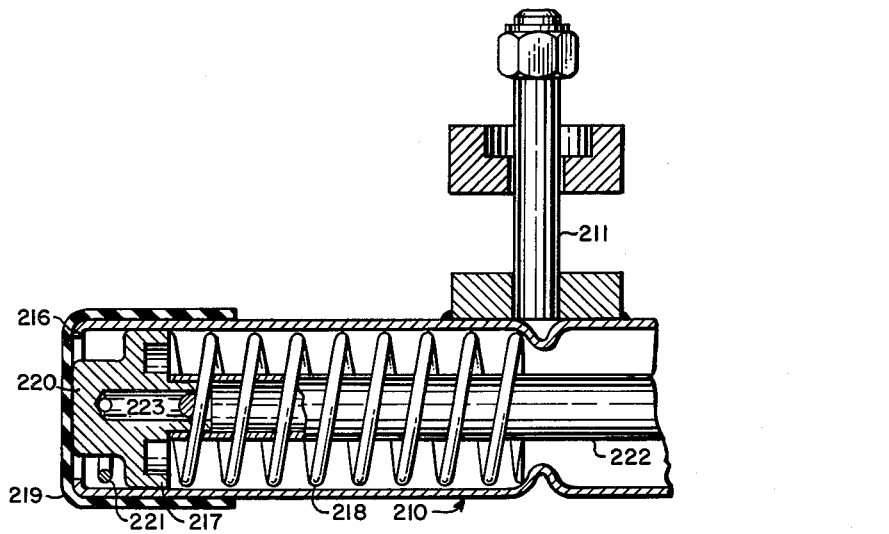
NEAL J. GRISWOLD
BLAIR B. FOWLER
DAVID A. YOUNG
INVENTORS
BY
ATTORNEY

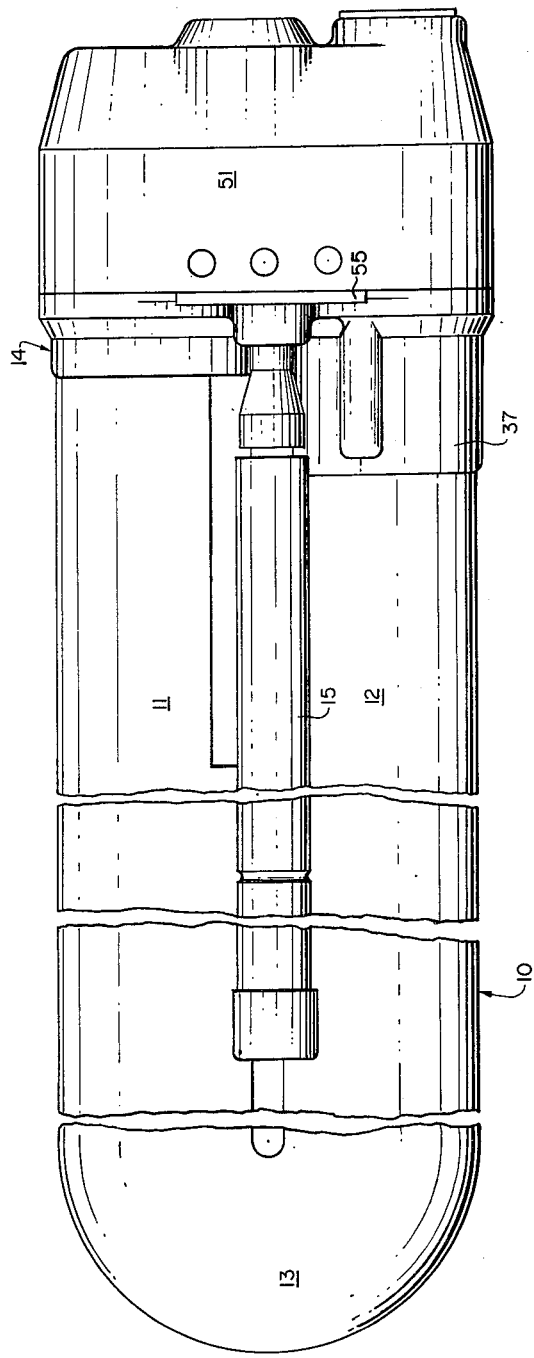

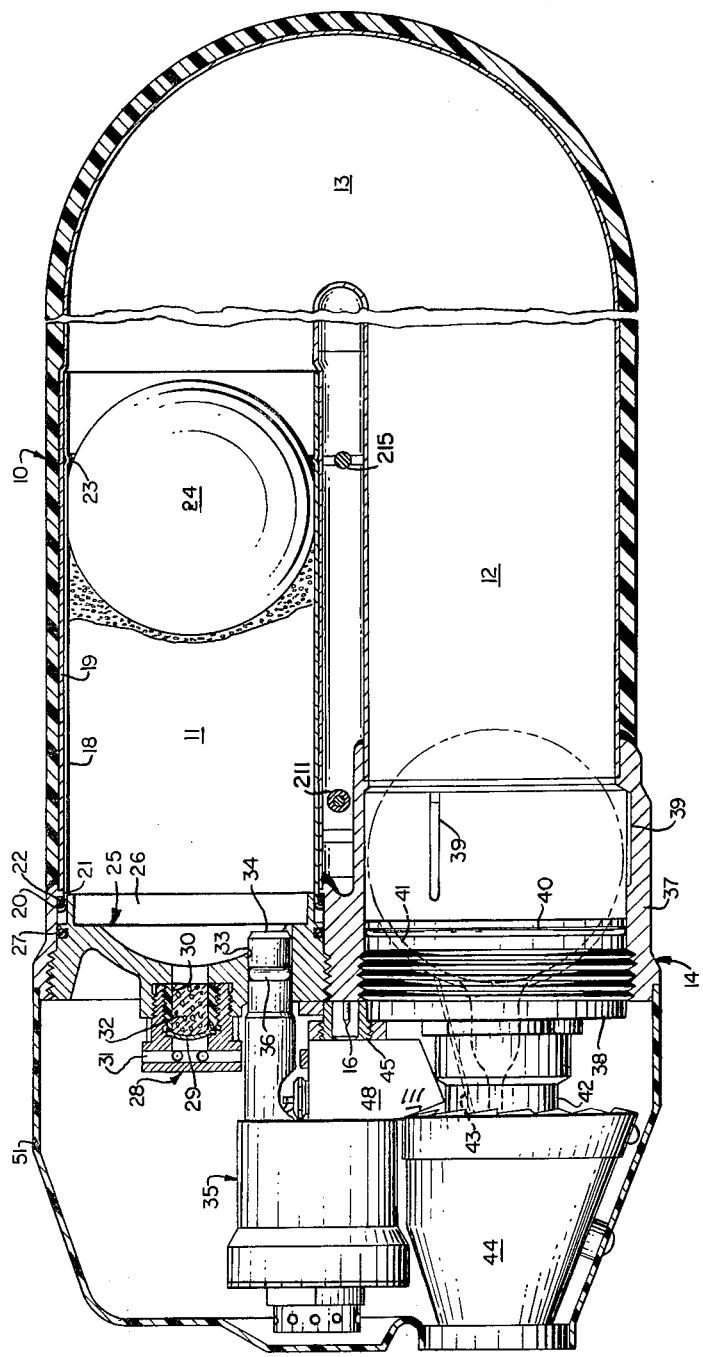

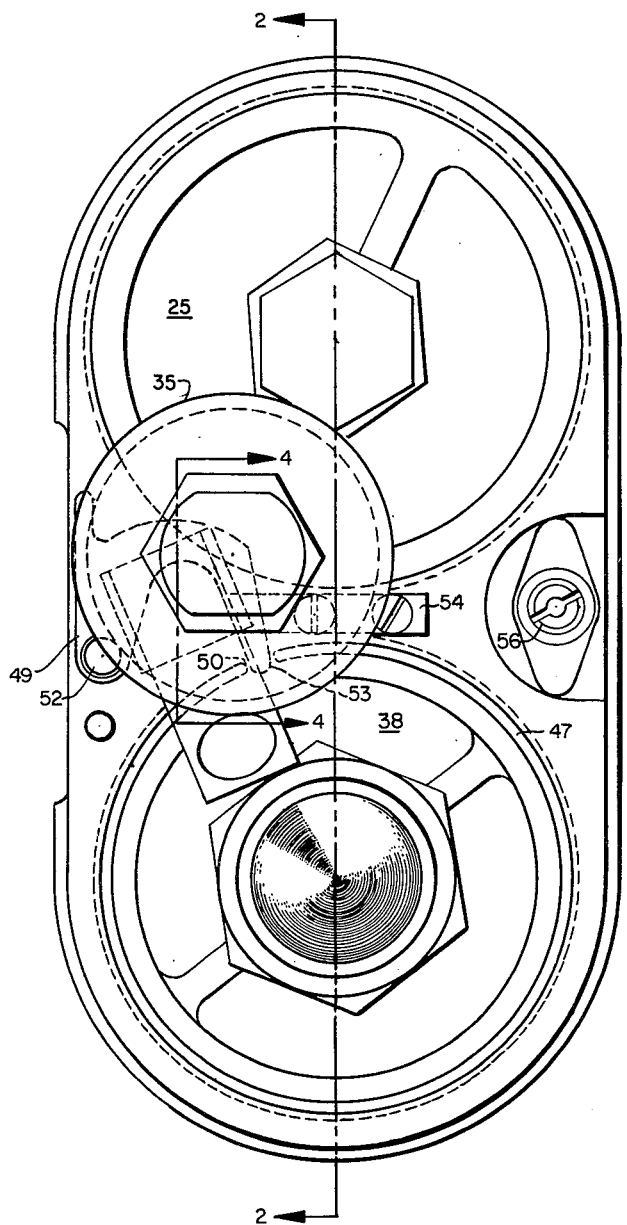

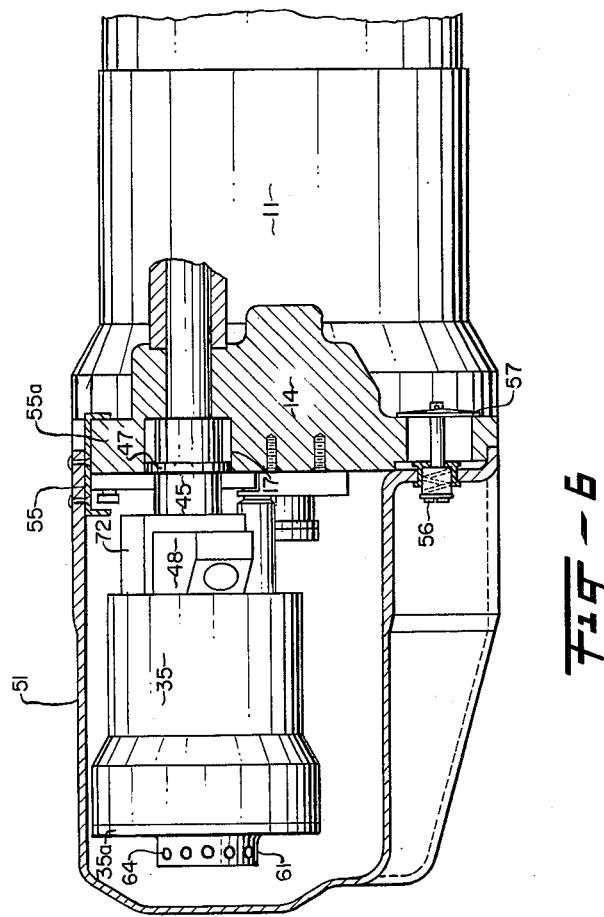

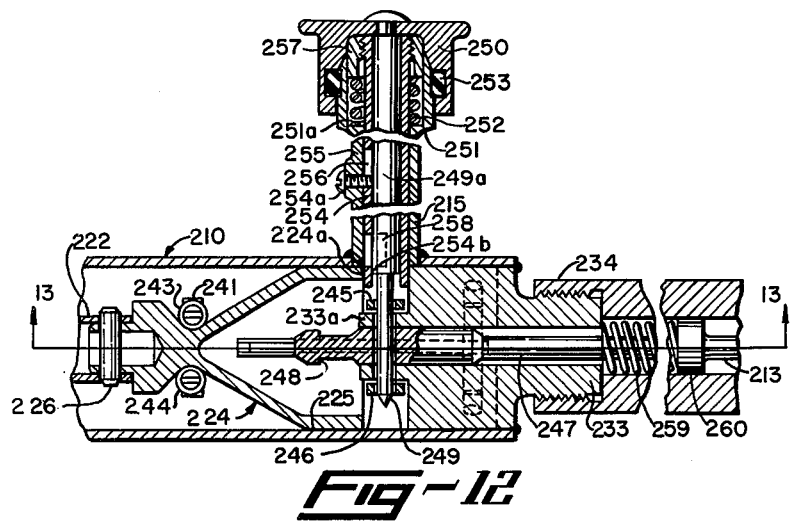
Fig-12
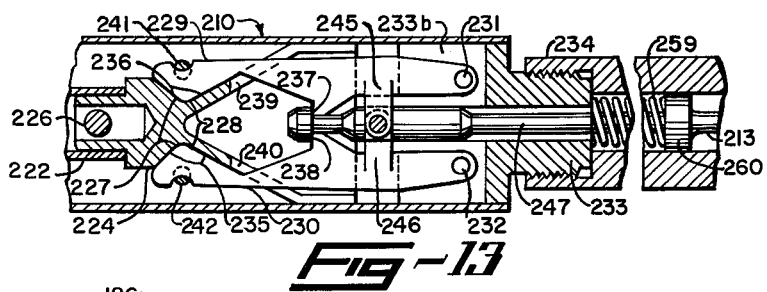
Fig-13
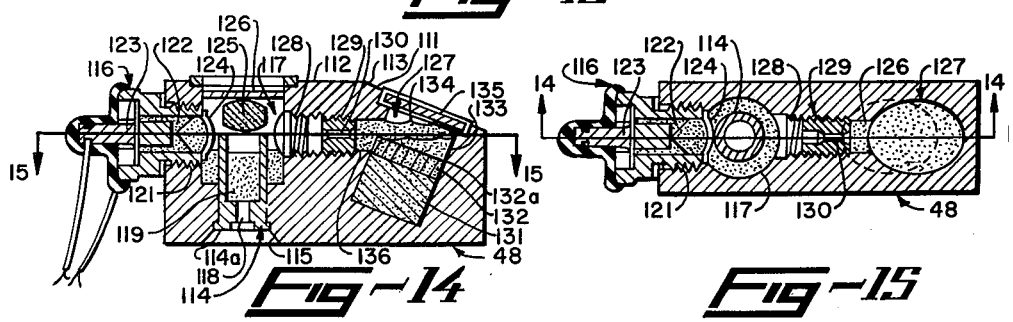
Fig-14
Fig-15

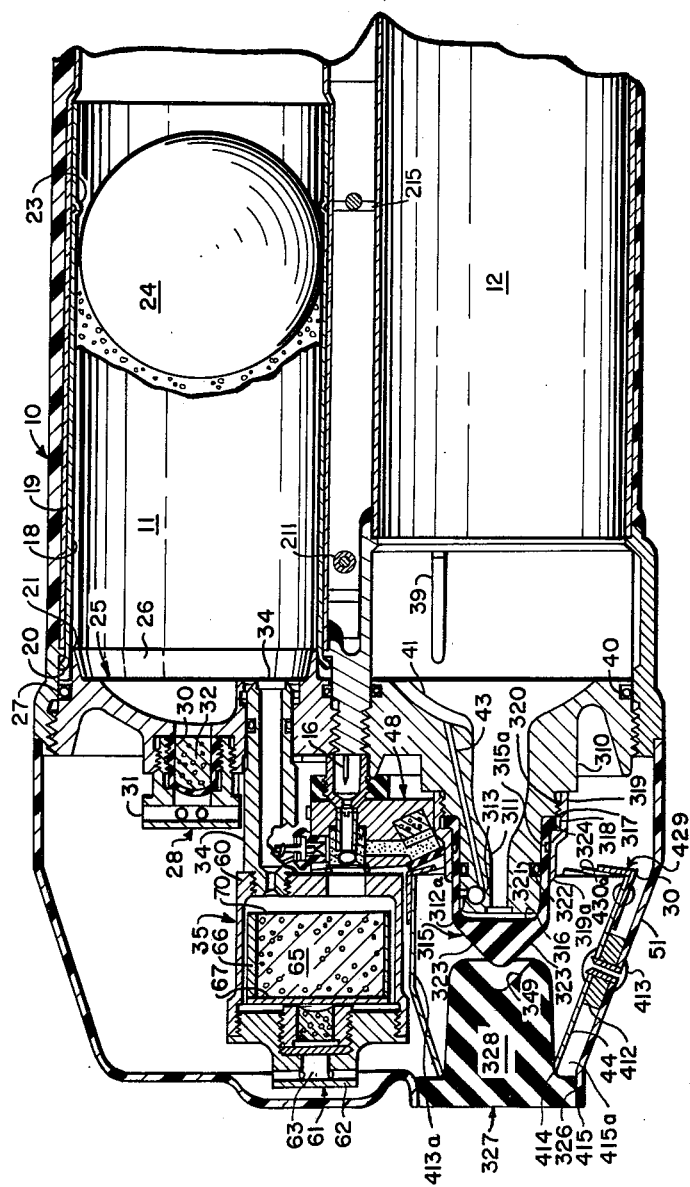

United States Patent Office 3,034,568
Patented May 15, 1962

3,034,568
FLAME THROWER
Blair B. Fowler, Monrovia, Calif., David A. Young, Washington, D.C., and Neal J. Griswold, Carmichael, Calif., assignors to Aerojet-General Corporation, Azusa, Calif., a corporation of Ohio
Filed Jan. 12, 1959, Ser. No. 786,350
12 Claims. (Cl. 158—28)

The present invention relates generally to fluid ejection apparatus and more particularly to means providing propulsive force for such apparatus.

The invention will be hereinafter described with relation to a one shot flame thrower by way of example but not as limitative of its use.

In flame throwers of the one shot type the fuel contained in a tank is ejected as a stream of ignited liquid by pressure of a gas. The present invention relates to both the arrangement of the means generating the gas and the general arrangement of the tank on which the gas generating means are mounted. One shot flame throwers are useful when light weight and portability are considerations outweighing the fact that the flame thrower must be serviced between each use.

A gas generator for flame throwers of the kind described must accordingly be capable of being rapidly recharged with the gas generating material and preferably provided with means by which it may be readily assembled in position. In addition, parts of the gas generator liable to require replacement due to wear should be capable of ready detachment. A further consideration applying both to the tank of the flame thrower and to the gas generator is that means should be provided for relief of excess pressure in case such pressure develops due to malfunction of the apparatus to which it is attached.

It is an object of the invention to produce a flame thrower of the one shot type which is capable of rapid dismantling after use, recharging, and accurate re-assembly by reason of its special design, by personnel without special training of the type required for the operation of flame throwers at present in use.

A further object of the invention is to provide a flame thrower having greater range than is obtained with the standard type of flame thrower although the device is both simpler, lighter and more easily serviced.

And another object of this invention is to provide a simple, rugged, and easily produced one shot flame thrower and a gas generator associated therewith which satisfactorily meets the requirements above outlined.

With the above referred to objects in view, the invention comprises a one shot flame thrower having a tubular tank folded to reduce its length, and provided with a piston member having a configuration effective to seal against the wall of the tank throughout its effective length. The tank is provided with closures for the inlet and outlet ends of the tank with a nozzle member mounted in the latter closure. Particular features of this invention are a novel gas generator connected to the inlet end of the tank and adapted to receive a charge of slow burning propellant, means carried on the flame thrower for igniting both the gas generator propellant and the stream of fuel projected, and novel means insuring positive orientation of the ignition means with relation to the gas generator.

In the drawings:

FIG. 1 is a side view of the assembled flame thrower.

FIG. 2 is a side view partly in section to show the arrangement of parts, shown in full lines, at the operative end of the flame thrower and the interior arrangement of the U-shaped tubular tank ends.

FIG. 3 is an end elevation of the head member of the tank, drawn on a larger scale, with the shroud and flame shield normally covering it removed to show the relative placement of operating parts of the flame thrower.

FIG. 6 is a fragmentary detail view partly in section showing a shroud in engagement with the head member and preventing disengagement of a latch ensuring correct assembly and retention of demountable operating parts on the plane surface of the head.

FIG. 7 is a central longitudinal section through the gas generator of this invention in assembled condition on the line 7—7 in FIG. 8.

FIG. 8 is a view in elevation of the end of the gas generator which is adapted to be attached to the head of the tank, taken on line 8—8 of FIG. 7.

FIG. 9 is a side elevation of the trigger housing, the figure being broken to reduce its length.

FIG. 10 is a top plan view of the parts shown in FIG. 9.

FIG. 11 is a section on the line 11—11 in FIG. 10 drawn in larger scale.

FIG. 12 is a section on the line 12—12 in FIG. 10 drawn in larger scale.

FIG. 13 is a section on the line 13—13 in FIG. 12.

FIG. 14 is a section of the igniter on the line 14—14 of FIG. 15.

FIG. 15 is a section of the igniter on the line 15—15 in FIG. 14; and

FIG. 16 is a cross section of the side view of the flame thrower and is similar to FIG. 2 with the gas generator, igniter, nozzle and shroud shown in cross section. The nozzle, shroud and associated structure are disclosed in the same assignee's concurrently filed application Serial No. 786,347.

Figure 5:
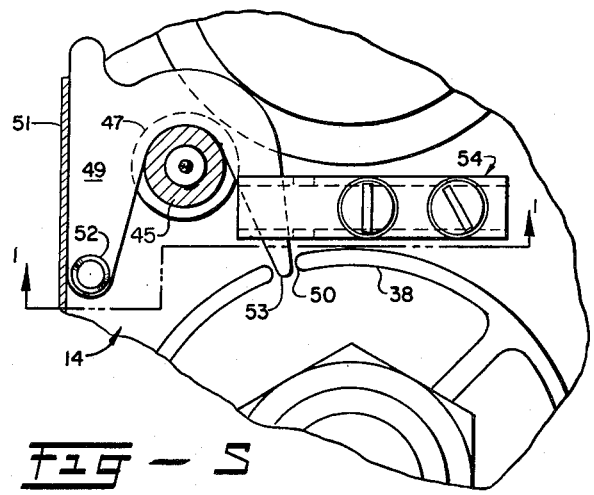
FIG. 5 is a fragmentary detail view on a larger scale illustrating the action of the locking means shown in FIG. 4 on the various demountable components of the flame thrower.

Referring now to FIGS. 1 and 2, the flame thrower is generally indicated at 10 and comprises an elongated tubular tank. In order to control both the initiation of the generation of gas to pressurize the tank and ignition of the fuel expelled from the tank, and at the same time reduce the bulk of the flame thrower, the tubular tank is bent into U form. The tank comprises an upper tube 11 and a lower tube 12 connected by a semi-circular elbow 13, all being of the same diameter, except for a short length 19 of slightly greater diameter at the commencement of the upper tube 11, to receive a spherical resilient surfaced piston member 24 mounted initially toward the inlet end of the upper tube.

The ends of the tubular tank 10 of the flame thrower are permanently connected to a head casting 14. All operating parts of the flame thrower are mounted on the head 14 except a removable tubular trigger member 15 of which the operative end containing a firing pin 16 is engaged in a bore 17 (FIG. 4) in the head 14. As shown in FIG. 1, the tubular body of the trigger 15 is arranged in the groove between the tubes 11 and 12 on one side of the flame thrower and held in position by a clamping bolt 211, FIG. 9, passing between the tubes 11 and 12 and engaging against the opposite side of the tank.

The flame thrower is so arranged that all parts except the tank and head are readily removable for cleaning or replacement.

As best illustrated in FIG. 2 the parts mounted on the head 14 comprise a protective sleeve 18 inserted in the widened inlet end portion 19 of the upper tube 11. The sleeve 18 is provided with an outwardly turned end flange 20 at its outer end slidable over the inner surface of the wall of the opening in the head 14, with which the upper tube 11 is aligned, and is limited in movement into the upper tube by an inwardly projecting flange 21 on said wall. An O ring seal 22 is positioned around the sleeve 18 between the outwardly turned end flange 20 thereof and the inwardly extending flange 21.

Toward its inner end the sleeve 18 is provided with a slightly inwardly projecting rolled peripheral bead 23 which locates the initial inward position of a spherical piston 24.

Into the open end of tube 11 is fitted a threaded closure 25 having a skirt portion 26 extending over the O ring 22 in order to protect it from over-heating, and an O ring seal 27 is provided between the closure 25 and the wall of the opening in the head 14 with which tube 11 is aligned.

The closure 25 is provided with a safety head 28 comprising a metal diaphragm 29 mounted across a central passage in the safety head 28 and held in position by a threaded sleeve 30 clamping the diaphragm 29 around its edge against an inner peripheral shoulder in the head. The central passage terminates in a plurality of passages 31 extending radially and in opposite directions from the center so that should a burst of the diaphragm 29 occur, the rush of high pressure gas does not cause any unbalanced force on the end of the flame thrower. A packing of insulating paste 32 is positioned between the metal diaphragm 29 and the inner end of safety head 28 in order to protect the metal diaphragm 29 against weakening due to the high temperature although transmitting the pressure of the burning propellant admitted to tube 11 to the diaphrgam 29.

The closure 25 is also provided with bore 33 receiving a gas delivery tube 34 extending from a gas generator 35 in gas tight relation to the closure by the provision of an O ring seal 36 arranged in a peripheral groove in the outer surface of the wall of the tube 34, which seal is compressed against the inner surface of the wall of the bore.

The character of the threads securing the closure 25 is different from the threads of the only other part of similar diameter which is the nozzle carrying closure 38 screwed into the head casting 14 and thus prevents any mistake in assembly.

The head casting 14 is formred with a tubular extending portion 37 to which the end of tube 12 of the tank is connected. The diameter of the tubular portion is preferably equal to that of the spherical piston 24 which is very slightly larger than the interior diameter of the tubular tank, so that whereas the resilient spherical piston is slightly compressed while traversing the tubular tank, it is not frictionally retained at the delivery end of the lower tube and may be rolled out when the nozzle carrying closure member 38 is removed.

The inner wall of the tubular head portion 37 is provided with grooves 39 to facilitate the passage of the pressurizing gas around the spherical piston when the latter is stopped by reaching the closure 38, the gases being utilized to blow out or purge the passages in the nozzle as will later be explained.

Closure 38 is threaded on its periphery and screwed into a threaded outer end portion of the tubular portion 37 of the head.

An O ring pressure seal 40 is positioned in a peripheral groove in the cylindrical surface of the closure 38.

The inner end surface of the closure 38 is curved to the contour of the spherical piston 24 and provided with a number of flutes or grooves 41 in the curved surface faired into the central passage through which the fluid is ejected from the nozzle 42 extending from the closure 38. The closure and nozzle 42 is also provided with a small diameter passage 43 opening at its inner end in one of said flutes 41 and serving to discharge a supply of secondary fuel into a flame shield 44 surrounding the nozzle and maintaining a flame around the jet of fuel issuing from the nozzle 42. The gas escaping from around the spherical piston also escapes through said narrow passage 43 and scavenges it. The end of the nozzle is covered with a rupturable cap 315, FIG. 16, which prevents loss of fuel until the tank is pressurized whereupon the fuel under pressure ruptures the cap and expels it through an opening in the shroud 51.

Figure 4:
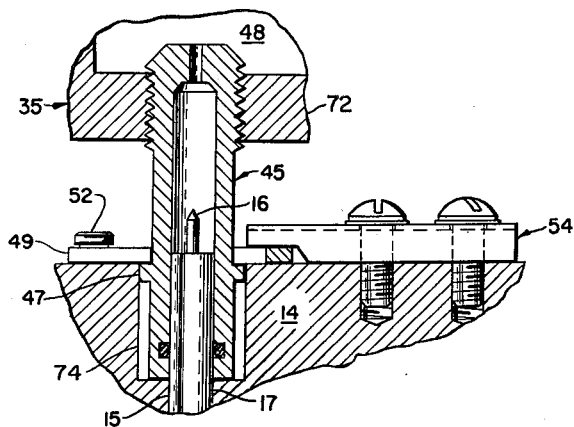
FIG. 4 is a fragmentary detail in section showing the mounting of a part effective to lock and retain in position the demountable parts mounted on the head member.

The gas generating chamber 35 in which a charge of propellant is positioned and ignited when it is required to pressurize the tank, is secured to the head member 14 by the engagement of a hollow threaded stud 45, FIGS. 2 and 4, engaging in a bracket 72 projecting from the chamber 35. The stud 45 is fitted into the counterbore 74 of a bore 17 in the head member 14. Stud 45 is provided with a collar 47 received in the bore and lies level with the plane surface of the head member 14. The stud member thus serves to stand off the gas generator 35 at the correct height from the top of the head member 14 and limits the entry of the gas discharge tube 34 into the tank inlet closure member 25. The stud 45 also serves to clamp an igniter element 48 in the bracket 72.

The igniter element 48 is arranged to both ignite the gas generating charge in the chamber 35 and the secondary jet of fuel in the flame shield. It is essential to locate the point of delivery of said secondary fuel relative to the flame emitted by the igniter, and this is effected by indexing the nozzle carrying closure as now described.

The latch member 49 (FIGS. 3, 4 and 5) is pivoted on the head member 14 at 52. The latch member 49 is hook-shaped and arranged so that when closed it lies over half the circumference of collar 47 of the threaded stud 45. A projecting finger 53 on the latch enters the notch 50 in an upstanding rim on the nozzle carrying closure 38. Unless the finger is not entered in the notch 50 the latch member 49 will not clear the rim of the head member 14 over which the shroud is a close fit and thus indicates improper assembly.

When the latch is properly entered, the back edge of the latch is aligned with the edge of the head member 14 and is held in position by the shroud member 51. A retaining bar 54 having an undercut end is screwed to the head 14 and engages over the finger 53 when in latched position.

The shroud member 51 (FIG. 2), comprises a positioning catch 55 formed as a channel shaped metal strip riveted to the shroud (FIG. 6), which slips over a rib 55a extending at each edge of the head, and a fastening stud 56 mounted at the opposite side of the shroud. The fastening stud is engaged with a retainer plate 57 (FIG. 6) mounted at the edge of the head provided the latch member 49 is correctly pushed into place.

Referring now to FIG. 7, the body of the gas generator 35 is in the form of a cylinder having a head portion 58 of enlarged diameter and thickness. The open end of the generator body is interiorly threaded to receive the head closure member 35a which is formed with a central stub 61 providing flats for the application of a wrench, and is screw threaded for screwing into the open end of the gas generator body.

The interior of the stub 61 is recessed from the inner surface of the closure and the wall of the recess is threaded to receive a burst-diaphragm and retaining member 62. An axial passage 63 is drilled into the stub from the bottom of the recess in which the burst-diaphragm is mounted to a depth sufficient to provide communication with a series of radial passages 64 drilled into the stub and providing for the escape of gas released by rupture of the diaphragm in mutually opposed directions, thus preventing forces being set up, caused by a malfunction, that might throw the flame thrower out of control.

The gas generating element is indicated at 65 and may be a charge or grain of suitable slow burning propellant in the form of a cylinder covered by an impregnated paper side restriction 66 and a back restriction 67 of fiberglass.

The closed end 60 of the cylindrical generator body is provided with an opening 68 which is threaded to receive the gas discharge tube 34 and with a port 69 through which the flame generated by an igniter element impinges upon the uncovered face 70 of the grain.

The outer face 71 of the bottom or closed end of the gas generator is provided with a bracket or stirrup member 72 preferably in the form of a U, the open side of which is welded to the face 71. A cross bar 73 is welded to extend across one open side of the U.

The igniter element 48, the construction of which is fully disclosed in the same assignee's copending patent application Ser. No. 786,349, filed concurrently on January 12, 1959, is thereby accurately positioned, cross-bar 73 ensuring that the igniter element is correctly placed in the stirrup relatively to the gas generating chamber so as to align an opening in the igniter, for the passage of flame therethrough, with the port 69 in the gas generator.

Referring now to FIGURES 14 and 15, the igniter, indicated by the numeral 48, comprises a rectangular steel block having one corner 111 angled off.

A first chamber containing a pyrotechnic material together with means for initiating the combustion thereof opens into the face 112. This acts to ignite the grain in a gas generator 35 containing a solid propellant grain 65. A second chamber containing an incendiary oxidizing combustible mixture opens into angled face 113, serving to ignite the jet of fuel sprayed into the flame cone (not shown).

The pyrotechnic materials in the first chamber may be ignited by a conventional black powder cartridge 114, the base 114a of which is shown mounted in a flared opening 115 serving to receive the head of a hollow clamping screw (not shown) by which the igniter is positioned in a stirrup projecting from the base of the gas generating chamber 35 and through which the firing pin 16 of a trigger member 15 extends. The flame of the ignited pyrotechnic material in the first chamber is directed against the grain to furnish sufficient heat to cause the grain of propellant to start burning after which it will generate the temperature and pressure to continue burning until completely consumed.

The material in the first chamber may be ignited alternatively by the glow plug indicated at 116.

The first chamber comprises a bore 117 which is narrowed to closely fit the base 114a of the blank cartridge 114 which is fired by the percussion cap 118 in the base, which ignites the charge of black powder 119 in the cartridge case. The surface of the powder is covered by a film 120 of "Mylar," a polyester plastic film produced by the Du Pont Company, or other suitable material to retain the powder in place.

An opening 121 in which the glow plug 116 is mounted is also filled with black powder 122 into which the heating filaments 123 of the plug extend and the inner end of the opening is covered with a thin film of highly inflammable cement 124 consisting of a mixture of cellulose nitrate and black powder in an acetone solvent.

A pellet 125 of pyrotechnic material consisting of powdered aluminum and ammonium perchlorate, is secured in position on the end of the cartridge by a nitrocellulose adhesive and the open end of the first chamber beyond the pellet 125 is closed by a waterproof plastic closure 126. The whole of the space in the first chamber except that shut off by the films of inflammable material is filled with powdered aluminum and ammonium perchlorate which, though not easy to ignite, produces high temperatures when burnt. The purpose of the pellet 125 is to prolong the period of combustion in chamber 117 to ensure ignition of the grain of propellant contained in the gas generator. Other pyrotechnic materials such as Thermit or the like may be used.

The second chamber 127 is connected to the first chamber 117 by a passage 128 which is threaded for a portion of its length, and a threaded plug 129 is screwed into the passageway. Plug 129 is axially drilled with a fine hole 130, the diameter of the hole being important since it should become clogged as soon as the inflammable material placed in the second chamber has been ignited by flame or white hot gas from the combustion of the material in the first chamber 117. A plug of copper drilled with a No. 80 drill which has a diameter of .0135" works well.

The use of a drilled removable plug has the advantage of enabling different sized passages to be provided to suit different materials.

The second chamber 127 is formed as a bore extending in from the sloped face 113. An incendiary pellet 131 of cylindrical shape is positioned on the bottom of the chamber, a starter pellet 132 being preferably placed above it and the two elements held in place by a snap ring 132a and a layer of starter paste 133, leaving a space 134 communicating with passageway 128. The opening of chamber 127 in the side 113 is closed by a frangible cover or closure 135 and the space in the passage and above the starter paste 133 is packed with black powder 136.

The cylindrical incendiary pellet 131, starter pellet 132 and starter paste 133 may be composed of an incendiary oxidizing combustible mixture such as, for example, cellulose nitrate and black powder in acetone solvent. Alternatively, a pyrotechnic type material may be employed. The apparatus of the present invention is particularly adapted to employ within the second chamber 127 a solid propellant having a higher temperature of burning than the pyrotechnic material by virtue of provision of means to close the second chamber 127, raising the pressure therein to ensure continued burning. As used herein a solid propellant material shall be understood to mean generally a mixture of an organic resin binder material acting as a fuel, combined with an inorganic oxiding salt.

The closures 126 and 135 are destroyed immediately on the activation of the igniter but until that time ensure that the igniter materials are protected from dampness.

*Operation of the Igniter*

When it is desired to cause operation of the igniter an electrical contact is closed sending current from a battery (not shown) through the fine wires 123 of the plug 116 and making them red hot, thus igniting the black powder in which the wires are embedded, destroying closure 124 and igniting the inflammable powder in chamber 117, thus generating a sufficient degree of heat to cause the pyrotechnic pellet 125 to burn, the heat and pressure destroying seal 126 and providing the conditions required to start combustion of the propellant grain notwithstanding a slight loss of pressure through the small aperture communicating with the second chamber of the igniter.

If it is preferred to initiate operation manually, the percussion cap 118 is fired and the black powder in the blank cartridge 114 is ignited and the above-described sequence of events takes place.

The incendiary oxidizing combustible mixture in the chamber 127 burns vigorously with a long tongue of flame momentarily but no high pressure rush of gas into chamber 127 due to the pressure of the burning grain takes place since the small diameter of the passage between the chambers of the igniter acts to both throttle the pressure and reduce the temperature of the fine stream of gas.

In actual practice it was found that the small diameter hole 130 became clogged very quickly and that combustion of the auxiliary fuel around the nozzle took place under steady conditions after initiation thereof by the igniter.

The igniter element 48 is adapted to be firmly held in place, and at the same time positioned for the operation of the firing pin of a trigger operated device fully described in copending patent application Serial No. 786,346, filed concurrently on January 12, 1959. The trigger acts to fire a cartridge effecting ignition of the igniter element, by means of the hollow stud 45 screwed into a threaded hole 74 provided in the bottom portion 48a of the U-shaped stirrup 72 which is made thicker than the side walls thereof. A gasket 75 is positioned in a depression in the surface of the igniter element surrounding the port 69.

Referring now to FIGURES 9 through 13 of the drawings, the trigger housing is indicated at 210, the housing having a mounting bolt 211 at its rear end at which an axially operated firing means or trigger 212 is mounted. The firing pin 16, shown at the forward end of the trigger housing, projects from a tubular guide 214 which is engaged in a tubular member in the head of the flame thrower. A small tubular housing 215 projects laterally from and is welded to the trigger housing toward the forward end thereof, and serves to mount both a safety pin and a safety latch member later described, both trigger and safety member requiring to be operated to fire the flame thrower after the safety pin has first been removed.

The parts arranged at the rear end of the trigger housing are shown in detail in FIGURE 11 in which the tubular trigger housing 210 is shown spun inward at its rear end 216 to retain a push or pull trigger member 217 held yieldably toward, but spaced from, end 216 by a coiled spring 218 shown in relaxed condition. The position of member 217 in unoperated position is determined by the trigger operating mechanism in cocked position, as will later appear. The rear end of housing 210 is closed by a rubber cap 219 forming a water-tight closure. The rear end of member 217 is formed as a button 20 projecting through the end of housing 210 to abut against the cap 219.

Button 220 is drilled to receive a ring 221 to which a lanyard may be attached after cap 219 has been removed; if it is desired to fire the flame thrower by remote control, in this event the flame thrower is lashed to a tree or otherwise secured in position.

Member 217 is rigidly secured to a tube 222 by pin 223, the tube 222 connecting member 217 rigidly to the trigger releasing mechanism (shown in FIGURES 12 and 13) which is arranged within tubular housing 210 adjacent to the laterally projecting tubular housing 15.

The trigger releasing mechanism is mounted on a generally conical hollow member 224, shown in FIGURES 12 and 13, which acts as a pawl spreader. Member 224 is provided with a cylindrical surface 225 which has a sliding fit within the tubular housing 210. The rear end of member 224 is machined to interfit with tube 222 and is rigidly secured thereto by pin 226. The rear end of member 224 is also formed to provide double cam-surface recesses 227, 228, axial movement of member 224 in either direction bringing one or the other of the cam-surfaces into operation.

A pair of flat pawl members 229, 230, are pivoted at their forward ends on pins 231 and 232 secured in a transverse slot 233b in axially bored forward closure member 233, the latter extending for a distance into the end of the tube 210 and projecting forwardly from it to mount the forward portion or extension 234 of the housing 210. Pawls 229 and 230 are formed at their free ends with double angular cam surfaces 235 and 236, fitting in the cam recesses 227 and 228, and intermediate their lengths with oppositely arranged detent shoulders 237, 238. The member 224 is slotted, as indicated at 239, 240, to receive pawls 229, 230, and enable them to swing about their pivots when member 224 is axially displaced in either direction. Pins 241 and 242 are arranged to project vertically from both surfaces of the free ends of the pawls, and coiled springs 243, 244 (FIGURE 12) are mounted between the pins of opposite pawls and act to hold the double cam-surfaces thereof yieldably against the cam-surfaces of the pawl spreader member 224.

Intermediate the length of each pawl member 229, 230, a locking tongue 245 and 246 is provided, which curves around a central rearward projection 233a of member 233.

A trigger plunger 247 is mounted in the bore of member 233, and in the cocked condition of the trigger, projects into the conical pawl spreader 224. A detent shoulder 248 is machined in the plunger 247 and is engaged by the detent shoulders 237, 238, of pawls 229, 230, in the cocked condition of the trigger.

A safety pin 249 mounted in housing 215 extends into holes, aligned in the cocked position, drilled through the locking tongues 245 and 246, through the central projection 233a of member 233 and through the trigger plunger 247. Pin 249 is secured to a cap 250 which is a push fit on the head of housing 215 which is increased in diameter at 251 and counterbored to receive a coil spring 252, the purpose of which is later explained.

An O ring seal 253 is positioned between cap 250 and the surface of the head 251.

It will be evident that until the safety pin 249 is withdrawn from engagement with the parts 245, 246, and 247, of the firing mechanism, no movement of those parts can take place.

Shank 249a of safety pin 249 is nested in a tube 254 functioning as a safety latch which is a sliding fit in housing 215 but is limited in its upward or outward movement by a threaded stud 254a mounted in a threaded boss 255 on housing 215 with the end of the stud engaging in a slot 256 in the wall of tube 254. A centrally apertured cap 257 is threaded onto the upper end of the tube 254, shank 249a being withdrawn through cap 257. The coil spring 252 is held under compression between the lower edge of the cap 257 and a shoulder 251a in the enlarged upper end 251 of tube 215 and holds the lower end of slot 256 against the inner end of threaded stud 254a.

The lower end of tube 254 is slotted part way through as indicated at 258 and in the unoperated position of the tube a solid surface 254b of the tube lies in position across the forward edge 224a of the pawl spreader member 224 and prevents any forward movement of this member although it does not prevent backward movement of the spreader member. The threaded stud 254a and slot 256 act also to maintain solid surface 254b in registration with the edge of the member 224.

The forward portion 234 of the trigger housing contains the firing spring 259 which is placed under compression between the forward end of member 233 and the rearward face of a cylindrical portion 260 of the firing pin plunger 247, which is shown as reduced in diameter between the rearward portion guiding the plunger in member 233 and cylindrical portion 260. Plunger 247 continues through the extension 234 of the trigger housing and is reduced in diameter at its forward end to form the firing pin 16.

The forward movement of the plunger is limited by forming the forward end portion 261 of the housing extension of less diameter than the diameter of the cylindrical portion 260 of the firing pin plunger which abuts the forward end of the enlarged bore containing the spring when the firing pin is released.

Operation of the Trigger Member

It is assumed that the equipment such as a one-shot flame thrower, to which the trigger is secured, is in condition for use and that the operator intends to discharge the equipment in the immediate future. The trigger would have been previously cocked when loading the flame thrower, this latter operation having been effected by pushing the firing pin rearwardly until pawls 229 and 230 snap over the shoulders 248 on the firing pin plunger 247.

The safety pin 249 is first withdrawn and laid aside, thus readying the equipment for use. The operator then grasps the equipment with both hands, the thumb of his right hand resting against the center of cap 219, in position to push the cap 257 inwardly. To fire the equipment, the operator must first push cap 257 to the limit of its movement, which is very small, and then press forward on cap 219, button 217 moving with the center of the cap, thus spreading the pawls and releasing the firing pin plunger enabling the compressed firing pin spring 259 to throw the firing pin 16 forward against the detonating device or other charge releasing means. The required travel of the cooperating manually operated parts is so short that their operation may be considered to be simultaneous.

If a lanyard is to be used, owing to particular circumstances making it necessary to discharge the equipment from a distance, the cap 219 is withdrawn and, before removing the safety pin, the lanyard is secured to ring 221 which is sized so that it may be swung through the open end of tube 210, and the equipment fixed in position for instance by lashing it to a tree. A pull on the lanyard will move the spreader member 224 rearwardly, since there is no obstruction to its rearward movement, resulting in spreading the cam plates and releasing the firing pin plunger.

The trigger of this invention is particularly designed for one-shot operation, that is to say, the equipment has to be recharged after each discharge and the device detonated by the firing pin removed, enabling the trigger to be recocked by pushing back the firing pin before a fresh detonator is inserted.

It will be noted that all parts of the flame thrower are readily taken down for inspection and replacement of any worn or defective parts.

The removal of the shroud 51 requires only a quarter turn of the fastener 56, after which the latch 49 is swung aside, and the gas generating chamber withdrawn with the expended igniter by an axial pull. The tank and nozzle closures are then unscrewed, the ball piston dropped out of the widened end of the lower tube, and the sleeve slid out of the upper tube by inserting the fingers of each hand and exerting oppositely directed pressure to the inside surface of the sleeve and pulling outwardly. The only resistance to the extraction of the sleeve is friction between the O rings 22 and 27 and inner surface of the bore in the head member 14.

After the renewal of expended parts such as the igniter 48 and gas discharge tube 34, which are subject to high temperature and pressure of the burning propellant, and recharging of the gas generator 35, the tank 10 is cleaned and the operative parts reassembled. The tank 10 is refilled while held in a vertical position, and the firing pin 16 is pushed downward to recock the trigger, after which the latch 49 is swung into operative position and locked in position by replacing the shroud 51. After the above described operations the flame thrower is in condition for use.

The nozzle 42 is also provided with a passage 43 through which a secondary supply of fuel bled from the tank is sprayed through a lateral orifice 313 near the end of the nozzle into a conical flame cone 44 surrounding the nozzle. The bled-off fuel is ignited by the igniter 48 to provide a flame whirling around the base of the fuel-rod issuing from the nozzle when the flame thrower is in operation and ignites the peripheral surface of the fuel.

To prevent loss of fuel before the flame thrower is put to use both through the main bore 311 and bleed passage 43, a cap 315 of frangible material is securely held on the nozzle 42. The cap 315 is made to fit over the end of the nozzle by inner flat surfaces 316 and the forward end and over the lateral orifice 313 by the inner surface of the body of the cap 316. The cap 315 is held in position by the engagement of an outwardly turned peripheral plane 317 at the open end of the cap with an interior flange 318 on a threaded ring 319 which is screwed onto a threaded shoulder 320 on the nozzle. The ring 319 is provided with a tubular portion or skirt 319a overlying the cap and acting to guide the cap in its forward movement off the nozzle.

The nozzle 42 is provided with an exterior peripheral groove 321 rearwardly of the lateral orifice 312a and an O ring 322 seal is seated in the recess to provide a leak proof seal between the outer surface of the nozzle and the inner surface of cap 315.

The cap is provided with a peripheral groove 315a in its wall located rearwardly of the engagement of O ring 322 with the cap. The thickness of the wall of the cap is thus reduced at the bottom of the groove to insure that the outer portion of the cap will be torn away when the pressure of the fuel in the main passage of the nozzle reaches about 200 lbs. per sq. in. at which pressure the fuel will be ejected from the nozzle as a rod-like stream.

The cap 315 is preferably provided with a conical forward end 323 and the inner diameter thereof at its rear open end is preferably flared outwardly as indicated at 324 to facilitate positioning by sliding the cap over the O ring 322.

The flame cone 44 is secured to a shroud 51 covering the forward end of the flame thrower. The shroud 51 is provided with an opening 326 aligned with the nozzle 42 and is of large enough diameter to provide an annular space around the forward end of the flame cone 44 to provide for the flow of atmospheric air around the exterior of the flame cone to enter the cone through the back thereof to sustain the flame therein.

The opening 326 is closed while the flame thrower is not in use by a plug 327 of light material such as foam plastic and of a shape such that it is expelled together with cap 315 by the impingement of the latter thereagainst when the fuel tank is put under pressure by the firing of the flame thrower.

The plug 327 is provided with a wide head 328 which is slightly tapered inwardly in the direction of the length of the plug so that it may be readily engaged in and disengaged from the opening 326. From the head 328 toward the inner end of the plug the diameter of the body thereof is reduced as shown to substantially that of the cap 315 and is of a length such as to be placed a short distance ahead of the cap. The rearward face 349 of the plug 327 is conically recessed similarly to the conical forward end of the cap 315. The rearward taper of the plug facilitates its passage through the opening 326.

When the flame thrower furnished with a nozzle provided with closure means arranged according to this invention is to be put into use, the liquid held in the tank is put under pressure by releasing pressure gas into a tank and the pressure therein will increase until the predetermined value is reached. The cap covering the nozzle will rupture around the weakened wall portion and the freed front end of the cap, which is initially guided for true axial movement by the skirt of the retaining ring, will be violently projected forwardly.

The forwardly moving cap engages almost immediately with the closure of the shroud, and the conical forward end of cap engages with the recessed conical inner end of the shroud closure thus exerting an axially directed force. This forces the head of the shroud closure out of engagement with the periphery of the opening in the shroud and both closures are carried out of the shroud by the rod-like stream of liquid under pressure and fall away from said stream.

The conical flame cone 44 is mounted within the shroud 51 and is spaced from the wall thereof by spacing blocks 412 and rivets 413. The flame cone 44 projects for a considerable distance beyond the delivery end of the nozzle.

The flame cone 44 is flattened in the area 413a on its inward side and its open end 414 is spaced peripherally from the edge 415 of an opening in the shroud 51 through which the concentrated stream of fuel, or fuel rod, is ejected.

The nozzle 42 from which the fuel rod is ejected under high pressure is located axially in the flame cone 44, and is carried by a closure 310 screwed into the head casting of the flame thrower to which the U-shaped tubular tank is mounted, the closure 310 closing the delivery end of the tank.

The nozzle passage 311 is stepped down in diameter toward the end of the nozzle ending in a length of bore of relatively small diameter.

A passage 43 for a secondary flow of fuel is drilled from the inner surface of closure 310 longitudinally through the wall of the nozzle and connects with the transverse passage 312a drilled through the wall of the nozzle adjacent its outer end. The arrangement of the passages is clearly shown in FIGURE 16.

Ignition of the secondary fuel is effected simultaneously with that of a propellant grain causing pressurization of the fuel in the tank, by a pyrotechnic charge in the igniter element 48 which is provided with another pyrotechnic charge to ignite the pressurizing grain. Both charges being ignited by operation of the trigger of the flame thrower. The direction in which the flame of the ignition charge is directed into the flame cone is chosen so as not to disrupt the fuel-rod. The flame of the ignition charge travels in the same direction as the fuel rod.

The air flow required to maintain burning of the secondary fuel is caused by the reduced air pressure set up in the flame cone by the injector action of the fuel-rod being ejected therethrough at high speed. Air from outside the front end of the flame thrower flows through the gap 415a between the shroud 51 and flame cone 44 and over the outside of the flame cone 44 into the space behind the air-directing and flame-holding member 429.

In order to give the air a whirling motion and aid in preventing the flame from spreading back from the flame cone, the flame holder member 429 is mounted on the back of the flame cone 44 and extends radially inwardly toward the nozzle.

The member 429 as shown in FIGURE 16 comprises a sheet metal ring cut part way through from one edge at a plurality of points, the cut portions being bent at right angles to the ring and twisted to form overlapping blades 430a. The ring of metal is flattened on one side to lie over and against the flattened portion 413a of the flame cone and is riveted thereto. The inwardly projecting blades are cut away at the location of the igniter 48.

The flame in the flame cone is maintained in a swirling path in contact with the fuel rod issuing from the nozzle and remains in contact with the surface of the rod for a distance sufficient to ignite the surface of the fuel rod. The fuel rod travels through the air burning only on its outer surface to a point at which the decreasing speed of the fuel rod due to its continued surface burning causes scattering of the end into droplets. On impingement, the burning stream splatters and envelopes the target in flame.

Initially all openings in the shroud nozzle and igniter are closed by means such as plugs or discs which are blown out of place. When the trigger of the flame thrower is operated to cause ignition of the gas generator, pressure is immediately applied to the tank, forcing a concentrated stream of fuel or "fuel rod" through the nozzle and flame cone and projecting it from the flame thrower.

A preferred embodiment of the invention has been specifically described and shown by way of example but not as limitative of the invention, since various modifications in the described embodiment may be made by those skilled in the art without departing from the scope of the invention as defined by the appended claims.

We claim:

1. A one-shot flame thrower, comprising: a tubular fuel tank folded to reduce its length; a piston member in said tank having a configuration effective to seal against the wall of the tank throughout its effective length; a closure for the inlet end of the tank; a closure for the outlet end of the tank; a fuel nozzle mounted on said outlet closure; a gas generator connected to the inlet end of the tank, said gas generator being adapted to contain a charge of propellant, the ignition of which generates gas effective to drive the piston member toward the outlet end of the tank while effecting ejection of the fuel through said nozzle as a stream; means carried on the flame thrower for igniting said propellant and for igniting said stream of fuel; and means for operating said ignition means.

2. A one-shot flame thrower comprising: a tubular fuel tank formed into U shape; a head member to which the open ends of the tubular tank are connected; a piston member in said tank having a surface configuration effective to seal against the wall of said tank throughout its effective length; a detachable closure for the inlet end of said tank; a detachable closure for the outlet end of said tank; a nozzle mounted on said outlet end closure; a gas generator detachably mounted on said head member; means connecting the interior of said gas generator with the inlet end of said tank between the inlet end closure and piston member, said gas generator being adapted to contain a charge of propellant, the ignition of which generates gas operating to drive the piston member toward the outlet end of the tank while ejecting fuel in said tank through the nozzle; means detachably carried on said head member for igniting said propellant in the gas generator and for igniting said stream of fuel issuing from the nozzle; and means for effecting operation of said igniting means.

3. A one-shot flame thrower as set forth in claim 1 and in which the inlet end of the tubular tank is provided with a portion of enlarged diameter; a protective sleeve inserted in said portion of enlarged diameter; pressure sealing means between said sleeve and the wall of the tank; and a skirt on the removable closure for the inlet end of the tank, said skirt extending over and being effective to protect said sealing means against excessive heat.

4. A one-shot flame thrower as set forth in claim 1 and in which the outlet end of the tank is larger in diameter than the main portion of the tank to enable the piston member to be readily removed from said larger diameter portion after removal of the closure member for the outlet end of the tank.

5. A one-shot flame thrower as set forth in claim 4 and in which said outlet end of the tank is provided with grooves in the inner surface of the wall of the tank to enable gas to pass around the piston member when at said outlet end of the tank, said gas escaping through said grooves, and purging said nozzle.

6. A one-shot flame thrower as set forth in claim 4 and in which said closure for the outlet end of the tank is shaped at its inner surface to the contour of the piston member to ensure complete exhaustion of the fuel in said tank, said outlet end of the tank having grooves in the inner surface of the wall thereof and the inner surface of the removable closure having grooves therein enabling gas to pass around the piston member into said nozzle.

7. A one-shot flame thrower comprising: a tubular fuel tank formed into U shape; a head member to which the ends of the tubular tank are connected; a spherical piston member in said tank; a detachable closure for the inlet end of said tank; a detachable closure for the outlet end of said tank; a nozzle mounted on said outlet end closure, said nozzle and closure having passages therethrough for the main stream of fuel expelled from the tank, and a passage therethrough for a secondary flow of fuel; a flame shield surrounding said nozzle, said secondary flow of fuel being directed into said flame shield; a gas generator detachably mounted on said head member and means connecting the interior of said gas generator with the inlet end of said tank between the inlet end closure and the spherical piston member, said gas generator being adapted to contain a charge of propellant, the ignition of which generates gas operating to drive the spherical piston toward the outlet end of the tank to eject fuel in said tank through the passages for the main and secondary flows of fuel; a dual-purpose igniter detachably mounted on said head member for igniting both the propellant in the gas generator and said secondary fuel directed into the flame shield; a latch member effective to retain the parts detachably mounted on the head member in operative position and, when released, enabling all said parts to be removed for cleaning and replacement if required; and means for effecting operation of said ignition means.

8. A one-shot flame thrower as set forth in claim 7 and in addition comprising: an incorrect-assembly indicator formed as a detachable shroud fitting on said head member and covering all detachable parts mounted thereon; said latch, when in proper operative position, clearing the perimeter of said head and being held against movement out of operative position by said shroud, while if not in proper position, the latch projects beyond the perimeter of the head and prevents said shroud from being placed in position on said head.

9. A one-shot flame thrower as set forth in claim 7 and in which said gas generator comprises: a hollow body having a closed end and adapted to contain a charge of propellant; parts mounted on the exterior of said body and serving to position and retain an ignition member; the wall of said body having a port for the passage of flame from said ignition member to the propellant in said hollow body; means for mounting the gas generator on said head member; a detachable closure member for said hollow body to enable propellant to be placed in the hollow body; and a tube connecting the interior of said hollow body and the inlet end of said tank and slidable through the closure for the inlet end of the tank in gas tight relation thereto.

10. A one-shot flame thrower as set forth in claim 9 and in which said gas generator comprises: said parts including a part mounted on said closed end and projecting toward said head member, said part being formed to detachably mount an igniter member and to aid in securing the gas generator to the head.

11. A one-shot flame thrower as set forth in claim 9 and in which said gas generator comprises: a hollow cylindrical body having a medial portion; a U-shaped part extending with its closed lower end outwardly from the outer face of the medial portion of the cylindrical body and adapted to detachably receive an igniter member and having a threaded opening in its medial portion; and a tubular member screwing into the medial portion of the U-shaped member to detachably retain said igniter means in said U-shaped part, said tubular member acting to aid in securing said gas generator on the head.

12. A one-shot flame thrower as set forth in claim 9 and in addition comprising: a projection of the outer surface of said detachable closure member arranged centrally thereof and formed with a recess extending into said projection from the inner surface of said closure member, and passages drilled through said projection into said recess parallel to the outer surface of said closure member; and a burst diaphragm member mounted in said recess whereby in the event of the bursting of said diaphragm, high pressure gases generated in said gas generating chamber will escape in directions counter to each other to the exterior of said projection.

References Cited in the file of this patent

UNITED STATES PATENTS

| | | |
|---|---|---|
| 1,304,710 | Seidler | May 27, 1919 |
| 1,463,518 | Thomas | July 31, 1923 |
| 1,606,910 | Wilde | Nov. 16, 1926 |
| 2,309,978 | Pratt | Feb. 2, 1943 |
| 2,400,242 | Malina et al. | May 14, 1946 |
| 2,408,111 | Truax et al. | Sept. 24, 1946 |
| 2,426,526 | Rutishauser et al. | Aug. 26, 1947 |
| 2,479,570 | Hayner et al. | Aug. 23, 1949 |
| 2,563,265 | Parsons | Aug. 7, 1951 |
| 2,671,312 | Roy | Mar. 9, 1954 |
| 2,753,801 | Cumming | July 10, 1956 |
| 2,943,673 | Hickman | July 5, 1960 |
| 2,952,309 | Fay | Sept. 13, 1960 |